Patented Aug. 31, 1948

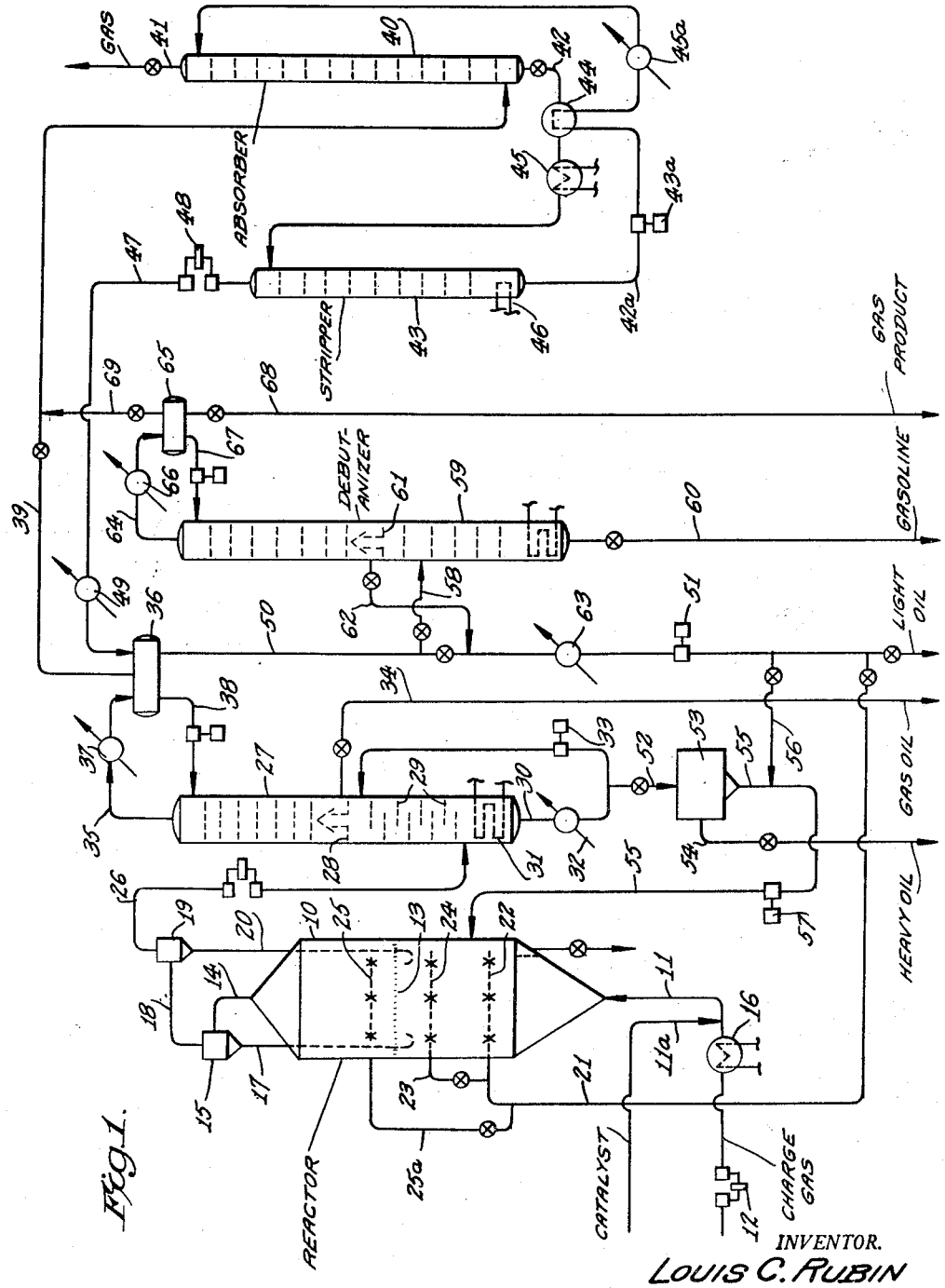

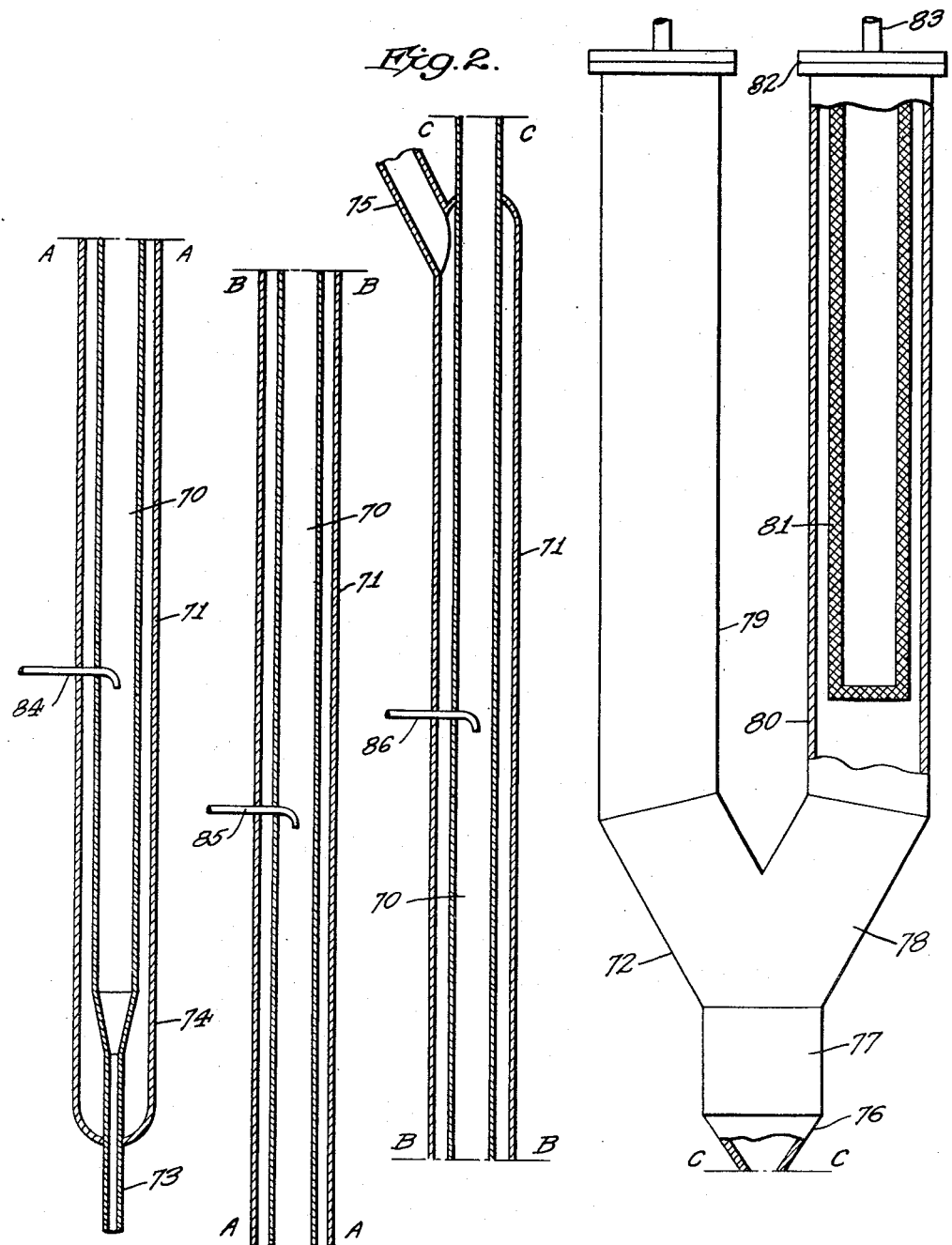

2,448,279

UNITED STATES PATENT OFFICE 2,448,279

SYNTHESIS OF ORGANIC COMPOUNDS

Louis C. Rubin, West Caldwell, N. J., assignor to The M. W. Kellogg Company, Jersey City, N. J., a corporation of Delaware Application August 23, 1944, Serial No. 550,799

3 Claims. (Cl. 260—449.6)

This invention relates to an improved method for hydrogenating carbon oxides to produce hydrocarbons and oxygenated organic compounds. The carbon oxides treated include not only carbon monoxide and carbon dioxide but also other organic compounds which contain the carbonyl group, such as ketones, aldehydes, acyl halides, organic acids and their salts and esters, acid anhydrides, amides, etc., and whose reaction with hydrogen to produce other oxygenated compounds and hydrocarbons is promoted by the catalysts and reaction conditions which are effective to promote the reaction of hydrogen with carbon monoxide or carbon dioxide.

While the improved process is applicable to the hydrogenation of these compounds of oxygen and carbon, hereafter referred to as carbon oxides, to produce both hydrocarbons and oxygenated organic compounds, the invention is particularly applicable to the large-scale production of hydrocarbons by the hydrogenation of these carbon oxides, particularly carbon monoxide.

In reacting a carbon oxide, such as carbon monoxide, with hydrogen to produce a desired product it is necessary to maintain the reaction temperature at the level at which the reactions leading to the desired product predominate over collateral reactions which form undesired products. Such temperature control is extremely difficult because the reactions resulting from the hydrogenation of carbon oxides are highly exothermic. In previous commercial installations for carrying out these reactions in the vapor phase it has been found necessary to place the catalyst, in the form of granules of substantial size, in elongated tubes or cases having a small cross-sectional dimension in order to facilitate the rapid transfer of the heat of reaction from the centers of the catalyst masses to a cooling fluid surrounding the tubes or cases. In other operations the catalyst is placed outside tubes through which cooling fluid circulates. In no case, however, has it been feasible to have any part of the catalyst mass more than about one half inch from a cooling surface. In carrying out the synthesis of hydrocarbons by this method on a commercial scale it is necessary to provide thousands of such tubes in order to obtain the necessary contact with cooling surface by a catalyst body of adequate volume.

Under such conditions it is necessary also to subject the catalysts to an extended preliminary conditioning treatment in which the reactants are passed over the catalyst at a low space velocity or in a state of dilution and at a relatively low reaction temperature in order to build up on the catalyst a deposit comprising hydrocarbons and other organic compounds. It is only after such preliminary conditioning of the catalyst that it is possible to pass the reactants at a reasonably high space velocity through the catalyst zone at the temperature which produces the desired reaction. The preliminary accumulation of deposits on the catalyst at the low temperature reduces the activity of the catalyst from its initial high activity. Apparently this prevents the occurrence in the catalyst tubes of local zones of intense reactivity which would produce heat at a rate in excess of the capacity of the apparatus to withdraw it from such local zones.

Even after the preliminary conditioning treatment the maximum permissible space velocity of the reactants through the catalyst zone is limited by the capacity of the reaction apparatus to withdraw heat from the reaction zone. The capacity of the apparatus is thus limited by the necessity for avoiding in any part of the reaction zone a reaction rate which would produce heat in excess of the capacity of the apparatus for withdrawing heat from such part at a rate of withdrawal effective to maintain the temperature in such part at the desired level.

It is an object of this invention to provide an improved method for reacting hydrogen with carbon oxides, in which the catalyst is employed in a highly efficient manner, and at a high space velocity, while rapidly removing heat from the zones of highest reaction rate in the catalyst chamber.

The present invention comprises contacting the gaseous or vaporous reactants with finely divided catalyst under conditions such that the catalyst is suspended in the reactants as a dense, pseudo-liquid, turbulent mass in which the catalyst particles circulate at a high rate to produce intimate mixing of the catalyst mass, and removing the heat of reaction, to control the reaction temperature, by injecting into the dense mass of circulating catalyst liquids which are vaporizable at the reaction conditions of temperature and pressure. The mass of contact material is contained in a suitable reactor, and the reaction gas mixture is passed upwardly through the mass at a velocity which is sufficiently high to maintain the mass of contact material substantially in suspension in the gas. The velocity of the gas stream is maintained sufficiently low to maintain the greater part of the catalyst mass in pseudo-liquid condition in which it exhibits many of the properties of a true liquid, particularly as to flowability and density. At the same time the velocity is maintained sufficiently high, in the preferred form of the invention, to produce in the relatively dense pseudo-liquid mass of finely divided material a highly turbulent motion of the particles, whereby they circulate at a high rate throughout the pseudo-liquid mass.

The fluidized mass of catalyst is quite dense, resembling in this respect a settled mass of the same material. The density of the fluidized mass ordinarily is not less than half that of the settled mass. While the dense turbulent catalyst mass is said to be suspended in the gas stream, this does not imply any movement of the catalyst mass as a whole along the path of flow of the gas stream. The catalyst mass is suspended in the gas stream but not entrained therein, although a portion of the catalyst may be carried away from the dense fluidized mass by becoming entrained in the gas stream emerging from the dense pseudo-liquid catalyst mass.

The gas mixture is introduced into the reactor through an inlet in the bottom of the reactor whereby the gas stream passes upwardly through the catalyst mass to be maintained in a fluidized condition. Conveniently the inlet comprises one or more connections whose aggregate cross-sectional area is substantially less than the corresponding dimension of the space in which the fluidized mass of catalyst is to be maintained. The gas stream thus passes into the reactor at a relatively high velocity which prevents the passage of catalyst out of the reactor against the entering gas stream. Inside the reactor the velocity of the gas stream decreases to the rate necessary to produce the desired degree of fluidization of the catalyst mass. For convenience the velocity of the gas stream in the reactor is given in terms of the theoretical velocity of the gas stream through an empty reactor, referred to hereafter as the superficial velocity. It is evident, however, that the velocity of the gas stream decreases to the superficial velocity only if the reactor is sufficiently larger than the volume of fluidized catalyst to permit the maximum possible disengagement of the gas stream and catalyst. As the concentration of catalyst in the fluidized mass varies from a maximum at the bottom to a minimum at the top the linear velocity of the gas stream would normally decrease as it passes upwardly through the catalyst mass even without reaction. The extent of the variation in the density of the fluidized mass is affected by the superficial velocity, the greatest variation in the density of the catalyst mass being observed at relatively high superficial velocity. The linear velocity of the gas stream is affected also by the contraction in volume of reactants as the reaction proceeds and by the expansion of vaporizing cooling liquids. Thus the superficial velocity at the top of the reactor may be greater or less than at the bottom.

If the catalyst chamber or reactor is somewhat larger than the volume occupied by the fluidized mass, the catalyst in the reactor appears to be distributed in two visually distinct phases. The first of these is the relatively dense, pseudo-liquid mass of fluidized catalyst, previously described, which occupies the lower portion of the reactor and comprises all but a minor proportion of the catalyst in the reactor. This phase is designated as the dense phase. The second phase, which occupies the upper part of the reactor, is a diffuse phase in which the concentration of contact material is far less, and of a different order of magnitude, than the average concentration in the dense phase. The diffuse phase may be said to be a disengaging zone in which the solids lifted above the dense phase by the gas stream are disengaged therefrom to the extent that such solids are present in excess of the carrying capacity of the gas stream at the minimum velocity reached by the gas stream in the reactor. In the diffuse phase, the concentration of catalyst material in the gas stream decreases as the latter flows upwardly to a minimum which approaches the carrying capacity of the stream at the superficial velocity. Between the dense phase of high concentration and the diffuse phase of low concentration there is a relatively narrow zone in which the concentration of solids changes in a short space from the high concentration of the dense phase to the low concentration of the diffuse phase. This zone has the appearance of an interface between two visually distinct phases.

While the invention includes within its scope operations involving contact material having sufficiently large particle size such that substantially no part of the contact material is carried by entrainment in the gas stream at the superficial velocity the preferred method of operation involves ordinarily the use of contact material and operating conditions such that a portion of the contact material is carried by entrainment in the gas stream at the superficial velocity. This results from the fact that finely divided contact materials are desirable as presenting a greater ratio of surface to volume and affording the maximum efficiency of heat transfer between particles and the further fact that sufficient mixing of a catalyst mass of substantial cross-sectional area ordinarily requires the use of superficial velocities which entrain a portion of the finely divided contact material in the gas stream. In this preferred method of operation mere settling is not sufficient to disengage all the catalyst from the gas stream emerging from the dense phase of the catalyst mass. Hence it is necessary to provide means in the reactor to separate entrained catalyst from the gas stream or replenish the catalyst mass by intermittent or continuous addition of finely divided catalyst to the reactor. Catalyst to be added to the suspended mass may be entrained in the entering gas stream and thus carried into the reactor or it may be added directly to the reactor at a point above the gas inlet. The catalyst thus charged to the reactor may comprise fresh contact material or catalyst previously carried out of the reactor by entrainment. Catalyst thus recovered and returned may be subjected to any appropriate treatment after recovery, such as cooling and revivification.

The gas stream is withdrawn from the top of the reactor through an exit which is ordinarily of substantially smaller cross-sectional area than the reactor. This provides a high velocity outlet for the gases which is surrounded by an area in which the gas velocity accelerates. The nearer this zone of accelerating gas velocity is to the dense phase, the greater is the concentration of solids in the gas stream entering the zone and the greater is the quantity of solids which must be recovered from the exit stream or separated by means in the reactor. The quantity approaches the carrying capacity of the high velocity exit gas stream when it is desired to maintain the upper level of the dense phase in the vicinity of the zone of accelerating velocity.

In the preferred method of operation the reactor is made sufficiently larger than the required volume of dense fluidized catalyst mass to provide a relatively large diffuse phase in which substantial disengagement of catalyst from the gas stream occurs by mere settling. The residual amount of catalyst still carried by entrainment is recovered from the gas stream outside the reactor, or separating means are provided in the reactor.

The operation is initiated by charging the reactor with a quantity of catalytic material which it is expected will be equivalent to the mass of catalyst maintained in the reactor in the dense phase. Thereafter, the passage of the gas stream through the reactor and upwardly through the catalyst mass is initiated at the velocity which fluidizes the mass, i. e., converts it to the relatively dense pseudo-liquid condition involving highly turbulent motion of the particles. At the same time if necessary there is commenced the addition of finely divided catalyst material to the reactor at a rate equivalent to the withdrawal of catalyst from the reactor in the gas stream by entrainment. Alternatively the highly turbulent dense pseudo-liquid phase may be established in the reactor initially by flowing the gas stream through a substantially empty reactor and charging the finely divided solid contact material into the reactor at a rate greater than the carrying capacity of the gas stream at the superficial velocity imposed by the dimensions of the reactor. As a result of this excess loading of the gas stream the desired dense phase is gradually built up in the reactor. When the height of the dense phase in the reactor is sufficient to produce the catalyst volume equivalent to the necessary space velocity of the reactants in the reaction zone the rate at which solids are introduced into the reactor is adjusted to correspond to the rate of withdrawal by entrainment.

In accordance with this invention the turbulent mass of suspended catalyst in the dense phase is maintained at the desired reaction temperature level by directly injecting into the dense phase liquids which are vaporizable at the reaction conditions of temperature, pressure and concentration. The quantity of such injected liquids and the distribution thereof in the reaction zone are controlled to produce substantially instantaneous vaporization of the liquids whereby the formation of agglomerates in the catalyst mass is avoided. In operations which produce a high degree of turbulence in the catalyst mass whereby the catalyst particles circulate at a relatively high rate the liquids may be injected into substantially any part of the dense phase. If the conditions of operations are such that circulation of the catalyst is effected to a lesser degree it is necessary to concentrate the injected liquids in that portion of the dense phase in which the reaction is proceeding at the greatest rate. The liquids which are vaporized in this manner are withdrawn from the reaction zone with the reaction products and unreacted gases and are separated from the reaction products externally of the reactor.

In this improved method of operation there is no necessity for removing catalyst material from the reactor in excess of the quantity which it may be desired to remove for revivification treatment or for the removal of waxy products therefrom. It is desirable, therefore, to maintain a relatively large disengaging space above the dense phase in the reactor to permit substantial separation of entrained contact material from the gas stream in the reactor. The amount carried overhead by entrainment may be limited to the quantity which is desired to withdraw for external treatment or the quantity removed by entrainment may be reduced to the minimum, by proper adjustment of the variations discussed above, and the catalyst withdrawn from the reactor for revivification or wax recovery may be removed directly from the dense phase at a lower point in the reactor.

The liquid which is injected to control the temperature in the reaction zone necessarily is one which is completely vaporized at the reaction conditions of temperature, pressure and concentration. The simplest and most available liquid for this purpose is water but the use of water may be undesirable in some instances because of an adverse effect on the catalyst mass by the water. Preferably the cooling liquid should be non-reactive with the catalyst and for this reason it is satisfactory ordinarily to employ a portion of the liquid product of the process, particularly when such liquid product is in a highly saturated condition. For example, in the hydrogenation of carbon monoxide to produce a hydrocarbon mixture a light naphtha produced in the process may be employed as the cooling liquid. This material is then recovered in the product recovery system and returned for reuse. Instead of the light naphtha a higher, or lower, boiling fraction may be employed. Alternatively similar materials obtained from any source may be employed. In the selection of a cooling liquid from an external source it is necessary to avoid the introduction of deleterious compounds, such as sulphur compounds, which may injure the catalyst. For this reason a liquid produced in the process is highly desirable as the cooling fluid.

To produce the turbulent pseudo-liquid condition in the dense phase it is desirable that at least a substantial proportion of the mass of contact material consist of particles whose free settling rate is less than the superficial velocity in the reactor whereby they are capable of being entrained in the gas stream. The mass of contact material may consist advantageously of a mixture of particles varying in size from 40 to 400 microns (average diameter). However, particles of larger or smaller diameter may be present. The catalyst mass may consist entirely of particles of a single catalytic material or a mixture of particles of different catalytic properties may be employed. For example, finely divided inert materials may be included in the catalyst mass.

The catalysts employed include those which promote the reaction of hydrogen and carbon oxides and which can be prepared in a physical condition suitable for the special manner in which the catalyst is to be employed in the improved process. Cobalt, nickel, and iron, with or without suitable supports and promoters, may be used. While kieselguhr has been found to be a superior support in previous processes involving this reaction it now appears that clays are superior in the improved process. A catalyst comprising a major proportion of a bentonite clay support, such as an acid treated bentonite type clay support as "Super Filtrol," in combination with cobalt and a minor proportion of a promoter such as thoria, manganese oxide, or magnesia has been found to be satisfactory.

The ratio in which the carbon oxide and hydrogen reactants are present in the mixture charged to the reaction zone may be varied in accordance with the character of the catalyst and the properties desired in the product. In the hydrogenation of carbon monoxide the hydrogen and carbon monoxide may be charged to the reactor in ratios which have been found satisfactory in previous fixed-bed operations. Ratios of $H_2:CO$ in the range of 1:1 to 2:1 are usually employed.

The operating conditions are generally similar to those employed in previous fixed bed operations. The gas stream may be passed through the reactor at a superficial space velocity of 100–1000 volumes (measured at standard conditions of temperature and pressure) of gas per hour per volume of fluidized dense catalyst phase. The temperature employed is affected largely by the nature of the catalyst. Cobalt and nickel catalysts usually are employed at 350–400° F. while iron catalysts require temperatures of 450–600° F. The pressure employed may vary from atmospheric to superatmospheric pressures which do not produce condensation in the reactor.

The invention will be described in more detail by reference to the accompanying drawings and by reference to specific operations embodying the invention. In the drawings Fig. 1 is a diagrammatic representation of apparatus for carrying out the invention and Fig. 2 is a view in elevation, partly in section, of the reactor employed in the specific operations which are described.

Referring to Fig. 1 the reactor 10 is provided with a quantity of powdered catalyst which, upon being fluidized by the passage of reacting vapors upwardly therethrough, forms a pseudo-liquid dense phase in the lower part of the reactor. The charge gas comprising, for example, hydrogen and carbon monoxide and in a usual ratio, is introduced into the lower part of reactor 10 through line 11 which is provided with a compressor 12. The dimensions of reactor 10 and the quantity of catalyst are regulated whereby the suspension of the catalytic contact material in the stream of gas introduced through line 11 produces a dense phase whose upper surface is sufficiently low to leave a substantial disengaging space above the dense phase. The upper level of the dense phase, that is, the interface between the dense phase and the diffuse phase in reactor 10 is indicated at 13. In accordance with the preferred method of operating the invention a substantial separation of entrained catalyst occurs in the area above the dense phase whereby the quantity of catalyst carried from the reactor in the high velocity exit stream is restricted to a minimum. The high velocity exit of the gas is provided by line 14 which connects at one end with the upper part of reactor 10 and leads to suitable separating means such as a cyclone separator 15.

The reacting gases enter reactor 10 through line 11 at a high velocity such that the finely divided catalytic material in reactor 10 does not pass downwardly from reactor 10 into line 11. The initial charge of catalyst or make-up catalyst may be introduced into reactor 10 by entraining it in the gas stream in line 11, from line 11a. As the reactants enter reactor 10 from line 11 there is a substantial decrease in the upward velocity of the gases. The rate at which the reactants are charged to reactor 10 is regulated to provide in reactor 10 an upward velocity which suspends the catalyst mass in the gas stream and provides a high degree of mixing of the catalyst mass whereby catalyst particles circulate throughout the dense phase. The vaporous reactants may be introduced through line 11 into reactor 10 at a relatively low temperature whereby they are heated to the reaction temperature by contact with the hot catalyst which is circulating in reactor 10. In initiating the operation the catalyst may be brought to the reaction temperature by temporarily preheating the charge gas, as by the provision of heating means 16. After the initiation of the reaction, preheating of the charge gas at 16 may be unnecessary and even undesirable.

As the reactants and reaction products emerge from the dense phase at the interface 13 they pass upwardly through the remainder of reactor 10 at a still lower velocity in which entrained catalyst is separated out of the gas stream. Preferably the height of the reactor is sufficient to permit disengagement of entrained catalyst to the point where the concentration of catalyst in the gas stream is reduced to an amount of the order of magnitude of the carrying capacity of the gas stream at the superficial velocity.

The mixture of reactants, reaction products and remaining entrained catalyst passes through line 14 into the cyclone separator 15 in which a substantial proportion of the entrained catalyst is separated. The catalyst thus separated at 15 is returned directly to reactor 10 by means of a suitable dip-leg 17 which extends downwardly into the reactor to a point below interface 13. Preferably the lower end of dip-leg 17 is turned up as shown to minimize the passage of reacting gases into dip-leg 17. The catalyst flowing downwardly in dip-leg 17 may be aerated if necessary by the injection of inert gases such as steam by means not shown.

The gas stream emerges from separator 15 through line 18 which connects with a second catalyst separator 19 similar in construction and arrangement to separator 15. In separator 19 a further separation of entrained catalysts is effected and solids thus separated are returned to reactor 10 through dip-leg 20.

As the reaction of hydrogen and carbon oxide is highly exothermic and as it is necessary to maintain the reaction zone, that is the dense catalyst phase below interface 13, at the temperature level which promotes the formation of the desired product, it is necessary to remove the heat of reaction from the reaction zone as it is developed. In accordance with this invention the removal of heat from the reaction zone is effected by the injection of liquids which are vaporized by the heat of reaction. This provides for substantially uniform temperature conditions throughout the dense phase which constitutes the reaction zone because the high rate of circulation of catalyst in the dense phase permits effective heat exchange between hot catalyst particles and particles which have been cooled by evaporating liquid.

In accordance with the preferred modification of this invention a relatively light oil produced in the process is employed as the cooling fluid. It will be understood, however, that this is primarily for convenience since a suitable liquid from any source may be employed. Such a liquid is supplied from the system through line 21 which connects with a distributing header 22. As the reaction is most intense near the entrance of the reactants the development of heat by the reaction occurs largely in the lower part of the dense phase. Consequently header 22 is located at or near the place in the lower part of the dense phase at which production of heat is greatest. However, it may be desirable to introduce cooling liquid at a higher point in the dense phase instead of, or in addition to, the introduction of liquid in the lower part of the dense phase. For example, a branch line 23 may be provided to connect line 21 with a distributing header 24 located in the upper part of the dense phase. It may be preferable to introduce the cooling liquid at 24 in order to avoid any suppression of the reaction which might occur through over cooling the catalyst particles in the zone of greatest reaction rate. Alternatively all or a part of the cooling liquid may be introduced through a suitable spray header 25 which is located above the dense phase. Header 25 is connected with line 21 by means of suitable branch line 25a.

The quantity of cooling liquid introduced through headers 22, 24 and 25 is regulated to the amount which will evaporate completely in the reaction zone. Preferably also the liquid employed is one which vaporizes readily at the reaction conditions whereby the time of residence of liquid in contact with the catalyst mass is limited. In this manner agglomeration of the catalyst particles is avoided. The vaporized cooling liquid passes overhead with the gas stream flowing through line 14.

The gas stream comprising unreacted gases, vaporous and gaseous products and vaporized cooling liquid together with any residual quantity of entrained catalysts flows from separator 19 through line 26 which connects with the lower part of a combined catalyst scrubbing and fractionating tower 27. Tower 27 is divided by a trap-out tray 28 into upper and lower sections. The lower section is operated primarily for the removal of entrained catalyst and condensation of heavy oil constituents of the product. While some fractionation may be effected the baffles 29 are arranged primarily to effect intimate contact of gases with a circulating liquid stream which flows downwardly over the baffles in contact with the upwardly rising column of gas. In this manner entrained catalyst is separated from the gas stream by condensation of liquids in the gas stream and by the scrubbing action of the circulating stream of liquid. The slurry which forms is recirculated from the bottom of tower 27 through line 39 to a point in tower 27 just below tray 28. Condensation and fractionation is afforded by heating the slurry in the bottom of tower 27 by heating means 31 and by cooling at 32 the stream of liquid circulating through line 30. A pump 33 is provided in line 30 to circulate the slurry.

In the upper part of tower 27 temperature conditions are regulated to effect separation of a condensate consisting of the liquid product boiling above the gasoline boiling range. Suitable gas and liquid contact means are provided to assist fractionation. The condensate collects on trap-out tray 28 and is withdrawn as a product of the process through line 34. This product is designated for identification as a gas oil but it is understood that its boiling characteristics are affected by the amount of the oil product which is separated as a condensate below tray 28. It will be understood furthermore that the separation of this fraction is merely illustrative of the recovery of an intermediate liquid product. It is evident that means may be provided for fractionating the liquid product into any desired number of fractions.

The uncondensed gases and vapors pass overhead from tower 27 through line 35 which connects with a separator 36. The gases and vapors passing through line 35 are cooled at 37 sufficiently to effect substantial condensation of the liquids and higher boiling gases such as those having three or four carbon atoms per molecule. This condensate separates from uncondensed gases at 36 and a portion of the condensate is returned to tower 27 through line 38 as reflux. In this manner the upper part of tower 27 is cooled to produce the desired condensation of higher boiling liquids. Rectification is provided by the hot vapors passing upwardly through tray 28 which heats the condensate collected thereon sufficiently to strip gasoline constituents therefrom. If the heating provided by this means is insufficient suitable heating coils or reboiling means may be provided on tray 28.

The uncondensed gases separated at 36 are withdrawn through line 39 which connects with the bottom of an absorber 40. In absorber 40 the gas stream is contacted with a descending stream of a hydrocarbon oil absorbent. This oil may be any suitable hydrocarbon oil such as a product of the process of the nature of a gas oil or heavy naphtha. This operation serves to scrub from the gas stream remaining light hydrocarbons which it is desired to include in the liquid product. The scrubbed gases are withdrawn from absorber 40 through line 41. The enriched absorbent is withdrawn from the bottom of absorber 40 through line 42 which connects with the top of a stripping tower 43. The enriched absorbent may be preheated during its passage through line 42 by heat exchange with lean absorbent at 44 and by special heating means 45. In stripping tower 43 the enriched absorbent is further heated by the application of heat at 46 in the bottom of tower 43 sufficiently to vaporize the light hydrocarbons absorbed in tower 40. Suitable gas and liquid contact means are provided in tower 43 to assist in the separation of the absorbed hydrocarbons and the absorbent. The stripped absorbent is returned to tower 40 through line 42a, by pump 43a, during which passage it is cooled at 44 and 45a. The vaporized light hydrocarbons pass overhead from tower 43 through line 47 through which they are returned to separator 36 by means of compressor 48. Substantially complete condensation of these hydrocarbons is effected by cooling at 49.

The condensate accumulated in separator 36 may be withdrawn as a product of the process through line 50 provided with a pump 51. In accordance with one modification of the invention this oil may be employed as the cooling fluid in reactor 10. For this operation line 21 is connected with line 50 as shown and a portion of the oil flowing through line 50 is diverted for injection into reactor 10 in the manner described above.

The slurry which is circulated through the lower portion of tower 27 and line 30 continuously receives accretion of oil and catalyst from the incoming reaction product. Consequently a portion of this slurry is diverted from line 30 through line 52 and passed to a settler 53. In settler 53 the slurry is treated to separate the greater part of the oil from the solid catalytic material. The oil is separately withdrawn from settler 53 through line 54 as a product of the process. The separated solid catalyst is withdrawn from settler 53 through line 55 in which it is mixed with light oil to form a slurry. Oil for this purpose is transferred from line 50 to line 55 by means of line 56. The reconstituted slurry is pumped through line 55 by means of pump 57 into reactor 10 at a suitable point. In this manner the catalyst separated at 53 is returned to the reaction zone for further use, as a slurry in which the vehicle is a portion of the light oil ordinarily injected into reactor 10 as a cooling fluid. The liquid component of the slurry introduced into reactor 10 through line 55 is quickly vaporized and the solid component of the slurry is converted to its former condition as a substantially dry catalytic material which is readily dispersed in the dense phase of the catalyst zone in reactor 10.

While the liquid product of the process recovered at 50 is entirely suitable for use as the cooling fluid and for reslurrying the recovered catalyst it will be understood that these functions may be performed by the same or different liquids obtained from an external source. The sole requirement of the cooling fluid is that it shall be readily vaporized at the reaction temperature whereby agglomeration of the catalyst particles is avoided. Instead of employing the wide boiling fraction represented by the product recovered at 50 it may be desirable to employ a relatively narrow boiling fraction obtained as a product of the process.

To obtain such a narrow boiling fraction the liquid product flowing through line 50 may be diverted through line 58 into a debutanizer tower 59. In tower 59 conditions of temperature and pressure are regulated to separate a bottom product comprising a debutanized gasoline which is withdrawn through line 60, and an overhead product consisting essentially of light hydrocarbons having three and four carbon atoms per molecule. An intermediate fraction of relatively narrow boiling range is separated as a liquid condensate on trap-out tray 61 which is located at a suitable point in tower 59 above the charge point. The condensate thus separated is withdrawn through line 62 which connects with line 50 in the manner shown for passage into lines 56 and 21. Cooling means 63 may be provided in line 50 as shown to precool the cooling liquid to any desired temperature.

The gases passing overhead in tower 59 are withdrawn through line 64 which connects with reflux drum 65. Cooling means are provided at 66 to effect substantially complete condensation of the gases. The condensate thus obtained is separated in drum 65 and a portion is returned to tower 59 as reflux through line 67, the remainder being withdrawn as a product of the process through line 68. Uncondensed gases separated at drum 65 may be passed to absorber 40 through line 69 which connects drum 65 with line 39.

Instead of the relatively light oils in lines 50 and 62 a heavier oil such as the gas oil in line 34 or the oil in line 54 may be employed, by means of suitable connections, not shown, as the cooling oil.

The invention will be described in further detail by reference to specific operations carried out in the small scale reactor illustrated in Fig. 2. In Fig. 2 the apparatus is shown in four sections which are joined at A—A, B—B and C—C. The apparatus of Fig. 2 consists essentially of three parts, which are a reactor 70, a shell 71 enclosing reactor 70, and catalyst filter means 72 which surmounts reactor 70. Reactor 70 is an elongated cylinder connected to a high velocity inlet pipe 73 by means of conical member 74. Jacket 71, which extends from a point near the top of reactor 70 to a point sufficiently low to enclose a substantial length of pipe 73, is adapted to contain a body of liquid, such as water, or "Dowtherm." This temperature control liquid is maintained in the annular space surrounding reactor 70 under pressure such that it boils at the temperature necessary to maintain liquid to produce the desired reaction temperature. The vapors which are evolved by the heat of reaction are withdrawn through pipe 75 at the top of jacket 71. Pipe 75 connects in turn with condensing means, not shown, in which the vapors are cooled and condensed and from which they are returned to the jacket 71 through pipe 75.

The remaining portion of the apparatus of Fig. 2, located above reactor 70 and in communication therewith, is the catalyst filter means 72 which is provided to separate catalyst which is carried upwardly out of the dense phase in reactor 70. The upper end of reactor 70 is connected by a conical member 76 with an enlarged conduit 77. This provided for an enlargement of the path of flow of the gas stream emerging from the reactor, with a corresponding decrease in upward velocity whereby partial disengagement of solids from the gas stream is effected. Conduit 77 is connected by a manifold 78 with conduits 79 and 80, which are similar in construction and diameter to conduit 77. Each of conduits 79 and 80 is provided with an internal filter which is illustrated at 81 in the portion of conduit 80 shown in section. Filter 81 is constructed of porous material which is permeable to the gases and vapors passing from reactor 70 but impermeable to solids carried by entrainment therein. Filter 81 is cylindrical in shape and closed at the bottom end. It is dimensioned in relation to conduit 80 to provide a substantial annular space between the outside of filter 81 and the outside wall of conduit 80 for the passage of gases and entrained catalyst upwardly about the outer surface of filter 81. The upper end of filter 81 is mounted in closure means 82 in a manner whereby the gases and vapors from reactor 70 must pass through filter 81 to reach the exit pipe 83. A similar filter is similarly arranged in conduit 79.

The principal parts of the apparatus of Fig. 2, aside from filters, are constructed of extra heavy steel pipe. Reactor 70 comprises a 153 inch length of extra heavy 2 inch steel pipe having an inside diameter of 1.94 inches and an outside diameter of 2.38 inches. Pipe 73 comprises extra heavy half inch steel pipe having an inside diameter of 0.55 inch, approximately 5 inches of this pipe being enclosed by jacket 71. The conical member 74 is approximately 3 inches long. Jacket 71 comprises a length of extra heavy 4 inch steel pipe having an inside diameter of 3.83 inches. Pipe 75 consists of extra heavy 2 inch steel pipe. The ends of jacket 71 are formed by closing the ends of the 4 inch steel pipe in any suitable manner as shown. Conduits 77, 79 and 80 and manifold 78 are formed of extra heavy 6 inch steel pipe having an inside diameter of 5.76 inches. The total length of the filter assembly represented by these conduits and member 76 is 61 inches. The filter 81 is approximately 3 feet long and approximately 4½ inches in outside diameter, the walls of the filter being approximately ¾ of an inch thick. The high velocity outlet at 83 is provided by more extra heavy half inch steel pipe.

The injection of cooling fluids into reactor 70 is provided for by nozzles 84, 85 and 86, which are located 18, 66 and 120 inches, respectively, above the lower end of reactor 70, which is the juncture between reactor 70 and conical member 74. Nozzles 84, 85 and 86 consist of steel tubing having an inside diameter of approximately 0.3 inch and have an orifice of about $\frac{1}{16}$ of an inch in diameter.

The catalyst filter means provided by filter 81 and the corresponding element in conduit 79 provide substantially complete separation of entrained finely divided catalytic material from the outgoing stream of vapors and gases. The filters in conduits 79 and 80 are employed alternately during the operation so that the stream of gases and vapors and entrained solids pass from conduit 77 through manifold 78 into one or the other of conduits 79 and 80. The filter which is not in use is at the same time subjected to a treatment designed to dislodge solids which have accumulated on the outer surface of the filter during the previous period of use. This treatment comprises flowing a gas stream inwardly through the usual exit pipe and through the filter in the reverse of the usual direction. The gas stream employed for this purpose flows out of the filter into the conduit and downwardly into manifold 78. At that point the downflowing gas combines with the upflowing stream of reactants from conduit 77 and the combined stream passes upwardly into contact with the filter in use. Any substantially inert gas may be employed for "blowing back" the filter but it is convenient to employ a portion of the uncondensed end gas from the process.

In the operation of the apparatus of Fig. 2 the desired quantity of finely divided solid catalyst is introduced into reactor 70 through a suitable connection, not shown, to conduit 77. The catalyst preferably is preheated to the reaction temperature prior to the contact of reactants therewith. This may be accomplished by heating the temperature control fluid in jacket 71 to the desired temperature or by passing hot inert gas through reactor 70. Alternately the catalyst may be given the final reducing treatment after introduction thereof into the reactor by the passage of hot hydrogen thereover. This is sufficient to preheat the catalyst.

The reacting gases may be introduced through pipe 73 at the reaction temperature or at room temperature or at higher or lower temperatures. If the reactants flow through pipe 73 at a temperature lower than the reaction temperature they are preheated ordinarily prior to actual contact with the catalyst to a temperature near the reaction temperature by heat exchange with the temperature control fluid in jacket 71 or they are preheated in the lower part of reactor 70 by contact with hot catalyst circulating from an upper part of the reaction zone.

In the apparatus of Fig. 2 the temperature control means provided by jacket 71 and the temperature control fluid therein are provided to illustrate the use of this method of removing the heat of reaction in combination with the direct injection of vaporizable cooling fluid through nozzles 84, 85 and 86. Furthermore in the relatively small scale apparatus of Fig. 2 the use of jacket 71 and the liquid contained therein is helpful in simulating the conditions which exist in a much larger commercial installation. In the single tube apparatus of the size shown in Fig. 2 the ratio of radiating surface to volume of the reaction zone is much higher than would be the case in a large installation. Consequently jacket 71 is helpful in keeping the radiation losses of the apparatus equivalent to those which would be encountered in a larger apparatus. Heating means, not shown, are provided to heat the liquid in jacket 71 to any desired temperature.

The reaction mixture is passed into the apparatus of Fig. 2 through pipe 73 at a velocity such that the catalyst is lifted out of pipe 73 and maintained in suspension in reactor 70. A ball check valve, not shown, is provided in pipe 73 to prevent catalyst from dropping completely out of the reactor when the gas stream is not being introduced through pipe 73. The gas stream is passed into pipe 73 at a velocity effective to aerate the catalyst mass in reactor 70 and suspend it in the gas stream therein. In the conditions described generally above, in which the lower part of the reactor is occupied by the dense phase of the fluidized catalyst mass and in which the upper part of the reactor is occupied by the diffuse phase, the lower boundary of the suspended catalyst mass is located somewhere between the upper and lower boundary of conical member 74. The upper boundary of the dense phase of the catalyst mass is determined by the superficial velocity of the gas stream and the quantity of catalyst charged to the reactor.

*Example I*

A catalyst for promoting the reaction of carbon monoxide with hydrogen was prepared as follows: 10,000 grams of cobalt nitrate,

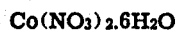

and 1910 grams of magnesium nitrate,

were dissolved in 50 liters of treated water. 6100 grams of sodium carbonate, $Na_2CO_3.H_2O$, were dissolved in 50 liters of treated water. Both solutions were heated to the boiling point and the nitrate solution was then added to the carbonate solution with continuous stirring. After the resulting mixture had been stirred thoroughly 4,000 grams of "Super Filtrol" (previously dried at 900° F. for 1.5 hours) at a temperature of 210° F. was added to the solution with vigorous stirring. After thorough stirring the resulting mixture was then filtered under a pressure of 30 pounds per square inch. The filter cake was washed in the filter with 160 gallons of treated water at 180° F. The washed filter cake was dried overnight at room temperature by means of a blower. The partially dried material was dried at 210° F. to a moisture content of about 54% and was then extruded through ⅜ inch dies. The extruded material was then dried overnight at 210° F. to obtain a product having a moisture content of about 16%. This material was then ground to produce a granular mass finer than 6 mesh but coarser than 20 mesh. The granular material thus produced was reduced in an oven by means of a circulating stream of hydrogen from which water and $CO_2$ were removed constantly. The temperature of the mass of catalyst during this operation was raised to a final temperature of 700° F. during which time the production of water ceased. The reduced catalyst was then ground in an atmosphere of $CO_2$ to a powder of the desired size. The following is a screen analysis of this powder.

| Size Range | Weight Per Cent |
| --- | --- |
| 40+ | 0.0 |
| 40/60 | 45.2 |
| 60/80 | 22.8 |
| 80/100 | 6.7 |
| 100/120 | 4.8 |
| 120/140 | 4.3 |
| 140/200 | 5.7 |
| 200/pan | 10.5 |

This catalyst had the following approximate composition in parts by weight: Co:0.15MgO:2.0 Super Filtrol.

Reactor 70 was purged by means of $CO_2$ and while a small stream of $CO_2$ was passed through the reactor 9 pounds of the catalyst prepared as above were introduced while maintained in an atmosphere of $CO_2$. The catalyst mass was then heated to approximately 400° F. by heating the water bath in jacket 71. During this time the catalyst was aerated with small streams of $CO_2$ until the temperature reached 300° F. Then hydrogen was used as the aerating medium until the admission of feed gas. After the catalyst mass had been heated to the desired reaction temperature the introduction of preheated feed gas was initiated. Conversion started substantially immediately and the operation was continued for some time during which the temperature was controlled by the water bath in jacket 71. Then the water was withdrawn from jacket 71 and the temperature in the catalyst bed was controlled by the introduction through nozzles 84, 85 and 86 of a naphtha, produced by the reduction of carbon monoxide with hydrogen, boiling between 126 and 360° F., and containing 16.6% mono-olefins. The connections between conduits 79 and 80 and the recovery system were reversed every 15 minutes and the catalyst filter not in use was blown back by the passage of tail gas therethrough in the reverse direction. The conditions observed and the results obtained during two periods of this operation are set forth in the following table under columns A and B.

|  | A | B | C |
|---|---|---|---|
| Hours on condition | 18 | 12 | 30 |
| Operating conditions: |  |  |  |
| Average catalyst temperatures, °F.— |  |  |  |
| 8.5 ft. above pipe 73 | 422 | 417 | 389 |
| 6.5 ft. above pipe 73 | 431 | 416 | 398 |
| 4.5 ft. above pipe 73 | 446 | 440 | 406 |
| 2.5 ft. above pipe 73 | 407 | 404 | 410 |
| 1.5 ft. above pipe 73 | 324 | 320 | 414 |
| 0.5 ft. above pipe 73 | 268 | 265 | 414 |
| Charge gas temperature, °F | 402 | 406 | 414 |
| Pressure (pounds/sq. in.)—Outlet | 25 | 25 | 25 |
| Bed conditions— |  |  |  |
| Bed height in feet | 8.2 | 8.0 | 7.3 |
| Catalyst density (pounds/cu. ft.) | 53 | 54 | 46 |
| Velocity (ft./sec.) at the inlet | 0.47 | 0.44 | 0.62 |
| Cu. ft. inlet gas/hr./cu. ft. catalyst | 398 | 376 | 585 |
| Liters inlet gas/hr./gram cobalt | 1.41 | 1.30 | 1.9 |
| Throughputs— |  |  |  |
| Gas entering catalyst bed (std. cu. ft.) | 1,182.2 | 727.3 | 2,583.9 |
| Gas leaving catalyst bed (std. cu. ft.) | 643.5 | 368.7 | 139.8 |
| Blow back gas to filter (std. cu. ft./hr.) | 13.4 | 11.4 | 14.4 |
| Ccs. of cooling liquid injected per hr. (at 70° F.)— |  |  |  |
| Through nozzle 84 | 1,025 | 960 | 0 |
| Through nozzle 85 | 1,845 | 2,705 | 0 |
| Through nozzle 86 | 10 | 0 | 0 |
| Analysis of Charge gas (air free): |  |  |  |
| Per cent $CO_2$ | 7.7 | 1.1 | 6.0 |
| Per cent CO | 25.3 | 27.0 | 24.7 |
| Per cent $H_2$ | 62.2 | 66.3 | 60.5 |
| Per cent $CH_4$ | 3.9 | 4.7 | 8.0 |
| Per cent $N_2$ | 0.1 | 0.1 |  |
| Per cent $H_2O$ | 0.8 | 0.8 | 0.8 |
| Results: |  |  |  |
| Per cent CO reacted | 67.5 | 71.6 | 76.0 |
| Per cent CO converted to methane and ethane | 23.1 | 27.2 | 21.7 |

The above data indicate that while substantial conversion of the reactants occurred with the development of sufficient heat of reaction to require the injection of the large amount of cooling liquid indicated the catalyst temperature was maintained within the required degree of uniformity and the fluidized condition of the catalyst was not affected by the liquid injected into the reactor and vaporized therein. The measure of temperature control is indicated by the small proportion of the CO which was converted to methane and ethane while reacting a large proportion of the CO in the charge gas. The low temperature near the bottom of the reactor apparently was caused by heat losses from the lower part of the reactor and pipe 73. The velocity in the foregoing table is based on feed plus vaporized oil injected through pipe 84.

For purposes of comparison the results obtained from a similar operation in which temperature was controlled entirely by means of the presence of cooling water in jacket 71 are given in the above table under column C. In the operation represented by column C water under a pressure of 204 pounds per square inch was maintained in jacket 71 to provide a water bath at a temperature of 389° F. The comparison of the results given in column C with those given in columns A and B indicates that the control of the temperature by direct injection of cooling fluid was as effective as that obtained by indirect heat exchange between the reactor and the surrounding water bath. This indicates the advantage in favor of the direct injection method since it is not dependent upon the use of a reaction zone of small diameter whereas the method represented by column C is dependent upon the use of a small diameter reaction zone as exemplified by reactor 70. That the operations represented by columns A and B provided good control of the reaction temperature is shown by the low conversion of carbon monoxide to methane and ethane obtained in these operations and the relatively uniform temperatures in the dense phase of the catalyst zone.

*Example II*

A catalyst was prepared in accordance with the following procedure:

A cobalt nitrate solution was prepared by dissolving 10,000 grams of $Co(NO_3)_2O.6H_2O$ in 50 liters of water. A sodium carbonate solution was prepared by dissolving 6,100 grams of $Na_2CO_3.H_2O$ in 50 liters of water. With both solutions at the boiling point the cobalt nitrate solution was added with stirring to the sodium carbonate solution. After thorough stirring 4,000 grams of dried "Super Filtrol" preheated to 180–200° F. were added with vigorous stirring. The slurry thus obtained was filtered and the filter cake was reslurried in 30 gallons of treated water. After standing for several hours the slurry thus obtained was heated to boiling with vigorous stirring, after which the slurry was filtered again. During this operation the filter cake was washed with 300 gallons of hot treated water. The filter cake thus obtained had a water content of approximately 70 weight per cent. This material was partially dried at room temperature to a water content of approximately 57% and was then extruded through a ⅜ inch diameter orifice. The extruded material was heated overnight in an oven at 420° F. The material thus obtained was in the form of hard lumps and had a water content of approximately 7.6 weight per cent. This material was then ground in a Braun disc mill and screened to collect material passing through a 40 mesh sieve. Material which did not pass the sieve was recycled to reduce the batch to a size smaller than 40 mesh.

The following is a screen analysis of this powder:

| Size Range | Weight Per Cent |
|---|---|
| 40+ | Trace |
| 40/60 | 5.0 |
| 60/80 | 6.9 |
| 80/100 | 4.0 |
| 100/120 | 1.0 |
| 120/140 | 9.4 |
| 140/200 | 12.9 |
| 200/pan | 60.8 |

6.3 pounds of this material was charged to reactor 70, this amount being chosen to produce 5.8 pounds of catalyst in the reactor after reduction. The unit was flushed out with nitrogen and then hydrogen was passed in through pipe 73. Jacket 71 was filled with a suitable temperature control fluid such as "Dowtherm" and by heating this fluid in the manner described above the temperature of the catalyst mass was gradually raised. After the temperature of the catalyst was raised to 400° F. the rate of introduction of hydrogen was increased to 40 cubic feet per hour and the temperature was raised, while operating at that velocity, to 700° F. This operation was continued until the formation of water ceased, after which the hydrogen flow rate was lowered to 5 cu. feet per hour and the temperature was lowered to 300° F. The catalyst composition was Co:2 Super Filtrol. The "Dowtherm" was removed from jacket 71 and replaced with water at a temperature equivalent to a catalyst temperature of 300° F. The introduction of feed gas was then initiated and the temperature was raised rapidly to 400° F. The flow of the reaction product through conduits 79 and 80 was reversed every 15 minutes and the catalyst filter not in use was blown back by the passage of tail gas therethrough in the reverse direction. This operation was continued for some time, during which the temperature was controlled by the water bath in jacket 71. Then the water was removed from the jacket and the temperature in the catalyst bed was controlled by the introduction of water through nozzles 84, 85 and 86. The conditions observed and the results obtained during a period of this operation are set forth in the following table under column D. In column E of the following table there are set forth the conditions and results of a comparable operation in which temperature control was obtained entirely by means of a water bath in jacket 71, the water bath being held under a pressure of 307 pounds per square inch to produce a water bath temperature of 425° F.

|  | D | E |
|---|---|---|
| Hours on condition | 6 | 24 |
| Operating conditions: | | |
| Average catalyst temperatures, °F.— | | |
| 6.5 feet above pipe 73 | 420 | 433 |
| 4.5 feet above pipe 73 | 435 | 440 |
| 2.5 feet above pipe 73 | 427 | 443 |
| 1.5 feet above pipe 73 | 424 | 448 |
| 0.5 feet above pipe 73 | 422 | 450 |
| Charge gas temperature | 280 | 77 |
| Pressure (pounds per square inch)— | | |
| Inlet | 48 | 47 |
| Outlet | 45 | 45 |
| Bed conditions— | | |
| Bed height in feet | 5.0 | 5.5 |
| Catalyst density (pounds/cu. ft.) | 54 | 49 |
| Superficial velocity (ft./sec.) at the inlet | 0.63 | 0.75 |
| Cu. ft. inlet gas/hr./cu. ft. catalyst | 970 | 1,170 |
| Liters inlet gas/hr./gram cobalt | 3.7 | 5.0 |
| Throughputs— | | |
| Gas entering catalyst bed (std. cu. ft.) | 573.3 | 3,168.0 |
| Gas leaving catalyst bed (std. cu. ft.) | 422.1 | 1,980.6 |
| Blow back gas to filter (std. cu. ft./hr.) | 14.1 | 10.4 |
| Ccs. of water injected per hour (at 70° F.)— | | |
| Through nozzle 84 | 220 | 0 |
| Through nozzle 85 | 150 | 0 |
| Through nozzle 86 | 110 | 0 |
| Analysis of charge gas (air free): | | |
| Per cent $CO_2$ | 3.3 | 3.0 |
| Per cent CO | 25.3 | 30.0 |
| Per cent $H_2$ | 66.4 | 61.7 |
| Per cent $CH_4+N_2$ | 4.2 | 4.5 |
| Per cent $H_2O$ | 0.8 | 0.8 |
| Results: | | |
| Per cent CO reacted | 33 | 46 |
| Per cent CO converted to methane and ethane | 3.0 | 11.4 |

The above data indicate that while substantial conversion of the reactants occurred with the development of sufficient heat of reaction to require the injection of substantial amounts of water the catalyst temperature was maintained within the required degree of uniformity and the fluidized condition of the catalyst was not affected by the water injected into the reactor and vaporized therein. The measure of temperature control in the operation of column D is indicated by the small proportion of carbon monoxide which was converted to methane and ethane and by the uniform temperatures in the catalyst bed.

In the operations of Examples I and II the control of the temperature of the catalyst mass, in the operations exemplifying the invention, was effected entirely by the injection of cooling fluid which was either naphtha or water. While this method of temperature control has been shown to be sufficient the invention includes within its scope also the use of the liquid injection method of temperature control in combination with other control methods such as indirect heat exchange of cooling fluid with the catalyst mass. The latter method of operation is illustrated by the following example involving operations in which the reactor 70 was surrounded by a water bath in jacket 71 and in which cooling was effected by the injection of a sufficient quantity of water to absorb the exothermic heat of the reaction as sensible heat and as heat of vaporization.

*Example III*

The same catalyst used in Example II was employed in this example. However, in the operation represented by column D of Example II jacket 71 was empty whereas in this example jacket 71 contained water maintained under a pressure equivalent to a temperature of 426° F. The operating conditions and results obtained in selected periods from two separate operations of this general nature are set forth in the following table:

|  | F | G |
|---|---|---|
| Hours on condition | 12 | 6 |
| Operating conditions: | | |
| Average catalyst temperatures, °F.— | | |
| 6.5 feet above pipe 73 | 433 | 431 |
| 4.5 feet above pipe 73 | 436 | 432 |
| 2.5 feet above pipe 73 | 430 | 430 |
| 1.5 feet above pipe 73 | 319 | 362 |
| 0.5 feet above pupe 73 | 414 | 310 |
| Charge gas temperature | 73 | 70 |
| Pressure (pounds per square inch) | | |
| Inlet | 48.5 | 47.5 |
| Outlet | 45.0 | 44.6 |
| Bed conditions— | | |
| Bed height in feet | 5.0 | 5.0 |
| Catalyst density (pounds/cu. ft.) | 53 | 54 |
| Superficial velocity (ft./sec.) at the inlet | 0.67 | 0.61 |
| Cu. ft. inlet gas/hr./cu. ft. catalyst | 935 | 961 |
| Liters inlet gas/hr./gram cobalt | 3.67 | 3.71 |
| Throughputs— | | |
| Gas entering catalyst bed (std. cu. ft.) | 1,151.6 | 582.6 |
| Gas leaving catalyst bed (std. cu. ft.) | 767.3 | 370.8 |
| Blow back gas to filter (std. cu. ft./hr.) | 17.0 | 25.6 |
| Ccs. of water injected per hours (at 70° F.) | | |
| Through nozzle 84 | 662 | |
| Through nozzle 85 | 0 | 706 |
| Through nozzle 86 | 0 | |
| Analysis of Charge gas (air and $H_2O$ free): | | |
| Per cent $CO_2$ | 4.1 | 2.0 |
| Per cent CO | 30.0 | 28.5 |
| Per cent $H_2$ | 60.8 | 65.2 |
| Per cent $CH_4$ | 4.0 | 4.0 |
| Per cent $N_2$ | 1.1 | 0.3 |
| Results: | | |
| Per cent CO reacted | 32.1 | 41.6 |
| Per cent CO converted to methane and ethane | 2.0 | 10.4 |

Satisfactory control of the reaction temperature in the operations represented by columns F and G of the foregoing table is indicated by the direct temperature measurements in the reactor and by the low percentage of the carbon monoxide feed which was converted to methane and ethane. It will be noted that in the operation represented by column F all of the water was injected through nozzle 84 near the bottom of the reactor whereas in the operation of column G the water was distributed more uniformly by injection through all three nozzles. Since the amount of water injected in these operations was approximately equivalent to the amount necessary to absorb all the heat of reaction by vaporization thereof and since complete vaporization did occur it is evident that the presence of the heated water bath around reactor 70 was effective principally to prevent cooling of the reaction zone by radiation, etc. In the single tube apparatus of Fig. 2 the ratio of surface to volume is much larger than it would be in a larger reactor of the type which would be employed in commercial practice. Consequently the operations of columns F and G, in so far as temperature control is concerned, simulate the conditions which would be encountered in commercial practice.

The invention has been illustrated by reference to the use of reactors of large cross-sectional area containing a single mass of catalyst and by reference to the use of reactors in which the catalyst mass is contained in one or more of a plurality of tubes of relatively small cross-sectional area. The first type of reactor is exemplified by reactor 10 of Fig. 1 and the second type of reactor is exemplified by Fig. 2. It will be understood that while the reactor of Fig. 2 is limited to a single tube, because of limitations on the size of apparatus for experimental use, the principles of operation illustrated thereby are directly applicable to a larger reactor made up of a plurality of tubes of the same or larger diameter in a common zone in which they may be in contact with a water bath in addition to being cooled by direct injection or in which they may be cooled entirely by the latter method.

While the tubular type of reactor exemplified by Fig. 2 may appear to involve the use of a catalyst mass of relatively small cross-sectional area the diameter of the tube comprising reactor 70 in Fig. 2 is, nevertheless, substantially greater than tubes in tubular reactors employing a fixed catalyst bed. In the latter the maximum diameter of the tubes is approximately ¼ that of reactor 70 whereby the tubes employed have a cross sectional area of approximately 1/16 that of reactor 70.

The cooling fluid which is injected into the reactor and into contact with the catalyst mass preferably is distributed in the reactor zone in a manner to permit substantially instantaneous vaporization of the liquid and prevent the accumulation of liquid in any part of the reaction mass. The latter result is undesirable since it may cause an agglomeration of catalyst particles into large masses whereby the fluidized nature of the catalyst mass would be impaired. In a reaction zone of large cross sectional area in which the catalyst circulates at a rapid rate throughout the reaction zone the distribution of the cool liquid in the reaction zone is carried out largely by the catalyst itself. On the other hand in reactors in relatively small cross-sectional areas such as Fig. 2, in which vertical circulation of catalyst is less effective it is more important to provide for proper distribution of cooling fluid by injection at a plurality of points as illustrated.

I claim:

1. A process for hydrogenating carbon oxides which comprises continuously flowing a gaseous mixture comprising hydrogen and a carbon oxide upwardly in a reaction zone through a mass of finely divided contact material comprising a catalyst for the reaction and at the reaction temperature to maintain the body of contact material substantially in suspension, limiting the upward velocity of the gaseous mixture to maintain the greater part of the mass of contact material in a relatively dense pseudo-liquid phase, maintaining the upward velocity of the gaseous mixture higher than the free settling rate of particles comprising a substantial proportion of said dense phase whereby there is produced highly turbulent motion of the particles of contact material in the dense phase in which the particles circulate throughout the dense phase at a high rate to promote uniform temperature conditions throughout the dense phase, providing a contact mass of sufficient bulk to produce a dense phase deep enough to afford a length of time of contact between the gaseous reactants and catalyst in the dense phase sufficient to react a substantial proportion of said carbon oxide with hydrogen, withdrawing said gaseous mixture from said reaction zone after passage thereof through said dense phase, treating said withdrawn gaseous mixture to separate therefrom a liquid containing finely divided contact material carried from the reaction zone by entrainment in said withdrawn gaseous mixture, and returning liquid containing catalyst thus recovered to said reaction zone.

2. A process for hydrogenating carbon oxides which comprises continuously flowing a gaseous mixture comprising hydrogen and a carbon oxide upwardly in a reaction zone through a mass of finely divided contact material comprising a catalyst for the reaction and at the reaction temperature to maintain the body of contact material substantially in suspension, limiting the upward velocity of the gaseous mixture to maintain the greater part of the mass of contact material in a relatively dense pseudo-liquid phase, maintaining the upward velocity of the gaseous mixture higher than the free settling rate of particles comprising a substantial proportion of said dense phase whereby there is produced highly turbulent motion of the particles of contact material in the dense phase in which the particles circulate in the dense phase at a high rate to promote uniform temperature conditions in the dense phase, providing a contact mass of sufficient bulk to produce a dense phase deep enough to afford a length of time of contact between the gaseous reactants and catalyst in the dense phase sufficient to react a substantial proportion of said carbon oxide with hydrogen, withdrawing said gaseous mixture from said reaction zone after passage thereof through said dense phase, treating said withdrawn gaseous mixture to separate therefrom a liquid containing finely divided contact material carried from the reaction zone by entrainment in said withdrawn gaseous mixture, separating catalyst from said liquid fraction, forming said separated catalyst into a slurry with a liquid which is completely vaporizable under the reaction conditions, and directly injecting said slurry into said reactor to effect vaporization of the liquid component of said slurry and commingling of the catalyst component with the said dense phase.

3. A process for hydrogenating carbon oxides which comprises continuously flowing a gaseous mixture comprising hydrogen and a carbon oxide upwardly in a reaction zone through a mass of finely divided contact material comprising a catalyst for the reaction and at the reaction temperature to maintain the body of contact material substantially in suspension, limiting the upward velocity of the gaseous mixture to maintain the greater part of the mass of contact material in a relatively dense pseudo-liquid phase, maintaining the upward velocity of the gaseous mixture higher than the free settling rate of particles comprising a substantial proportion of said dense phase whereby there is produced highly turbulent motion of the particles of contact material in the dense phase in which the particles circulate in the dense phase at a high rate to promote uniform temperature conditions in the dense phase, providing a contact mass of sufficient bulk to produce a dense phase deep enough to afford a length of time of contact between the gaseous reactants and catalyst in the dense phase sufficient to react a substantial proportion of said carbon oxide with hydrogen, withdrawing said gaseous mixture from said reaction zone after passage thereof through said dense phase, treating said gaseous mixture to separate therefrom a relatively high boiling liquid fraction containing finely divided contact material carried from the reaction zone by entrainment in said gaseous mixture and a lower boiling liquid fraction completely vaporizable under the reaction conditions, separating catalyst from said high boiling fraction, forming said separated catalyst into a slurry with at least a portion of said low boiling liquid fraction, and injecting the slurry thus formed directly into the reaction zone to effect vaporization of the liquid component of said slurry and commingling of the catalyst component of said slurry with said dense phase.

LOUIS C. RUBIN.

REFERENCES CITED

The following references are of record in the file of this patent:

UNITED STATES PATENTS

| Number | Name | Date |
|---|---|---|
| 1,955,873 | Deanesly | Apr. 24, 1934 |
| 1,984,380 | Odell | Dec. 18, 1934 |
| 2,266,161 | Campbell et al. | Dec. 16, 1941 |
| 2,309,034 | Barr | Jan. 19, 1943 |
| 2,347,682 | Gunness | May 2, 1944 |
| 2,360,787 | Murphree et al. | Oct. 17, 1944 |

FOREIGN PATENTS

| Number | Country | Date |
|---|---|---|
| 379,335 | Great Britain | Aug. 26, 1932 |
| 474,191 | Great Britain | Oct. 27, 1937 |